(12) United States Patent
Schiel et al.

(10) Patent No.: US 8,251,096 B2
(45) Date of Patent: Aug. 28, 2012

(54) SLIDE VALVE

(75) Inventors: Lothar Schiel, Hofheim (DE); Stefan A Drumm, Saulheim (DE)

(73) Assignee: Continental Teves AG & Co. oHG (DE)

( * ) Notice: Subject to any disclaimer, the term of this patent is extended or adjusted under 35 U.S.C. 154(b) by 508 days.

(21) Appl. No.: 12/524,648

(22) PCT Filed: Jan. 15, 2008

(86) PCT No.: PCT/EP2008/050377
§ 371 (c)(1),
(2), (4) Date: Jul. 27, 2009

(87) PCT Pub. No.: WO2008/092735
PCT Pub. Date: Aug. 7, 2008

(65) Prior Publication Data
US 2010/0071791 A1 Mar. 25, 2010

(30) Foreign Application Priority Data
Jan. 31, 2007 (DE) .......................... 10 2007 004 797
Jul. 5, 2007 (DE) .......................... 10 2007 031 290

(51) Int. Cl.
*F16K 11/07* (2006.01)
(52) U.S. Cl. .................................................. 137/625.68
(58) Field of Classification Search ............. 137/625.68, 137/625.69
See application file for complete search history.

(56) References Cited

U.S. PATENT DOCUMENTS

| | | | |
|---|---|---|---|
| 3,422,852 A | | 1/1969 | Ney |
| 3,552,433 A | * | 1/1971 | Mason .......................... 137/553 |
| 3,744,523 A | | 7/1973 | Hill |
| 4,457,341 A | | 7/1984 | Aspinwall |
| 5,361,803 A | * | 11/1994 | Stoll .......................... 137/625.66 |
| 5,496,101 A | | 3/1996 | Kurokawa et al. |

FOREIGN PATENT DOCUMENTS

| | | |
|---|---|---|
| DE | 2 412 652 | 10/1974 |
| DE | 29 44 706 A1 | 5/1981 |
| DE | 32 44 986 A1 | 6/1983 |
| DE | 39 12 936 A1 | 10/1990 |
| DE | 42 05 173 A1 | 8/1993 |
| DE | 44 43 373 A1 | 6/1995 |
| FR | 986.439 | 7/1951 |

(Continued)

*Primary Examiner* — Craig Schneider
(74) *Attorney, Agent, or Firm* — RatnerPrestia

(57) ABSTRACT

A slide valve for regulating the hydraulic pressure at a working connection to values between a low pressure and a high pressure, for which purpose a valve slide is accommodated in a hole of a housing such that it can move linearly, which housing has a low pressure connection, a high pressure connection and the working connection, for which purpose the working connection is connected to the low pressure connection in the first position of the valve slide, while the working connection is separated from the two further connections in a second position of the valve slide, and having a third position of the valve slide, in which the working connection is connected to the high pressure connection (P). A plurality of radial holes are arranged in the valve slide, through which radial holes flow can pass and which radial holes interact with a plurality of circumferential control edges in the housing which seal the valve slide in the hole in a leakfree manner by means of suitable sealing rings.

18 Claims, 1 Drawing Sheet

FOREIGN PATENT DOCUMENTS

| | | |
|---|---|---|
| FR | 1.021.915 | 2/1953 |
| FR | 2 887 950 A1 | 1/2007 |
| GB | 495660 | 11/1938 |
| GB | 14519764 | 12/1976 |
| GB | 2 112 109 A | 7/1983 |
| NL | 283489 | 1/1965 |

\* cited by examiner

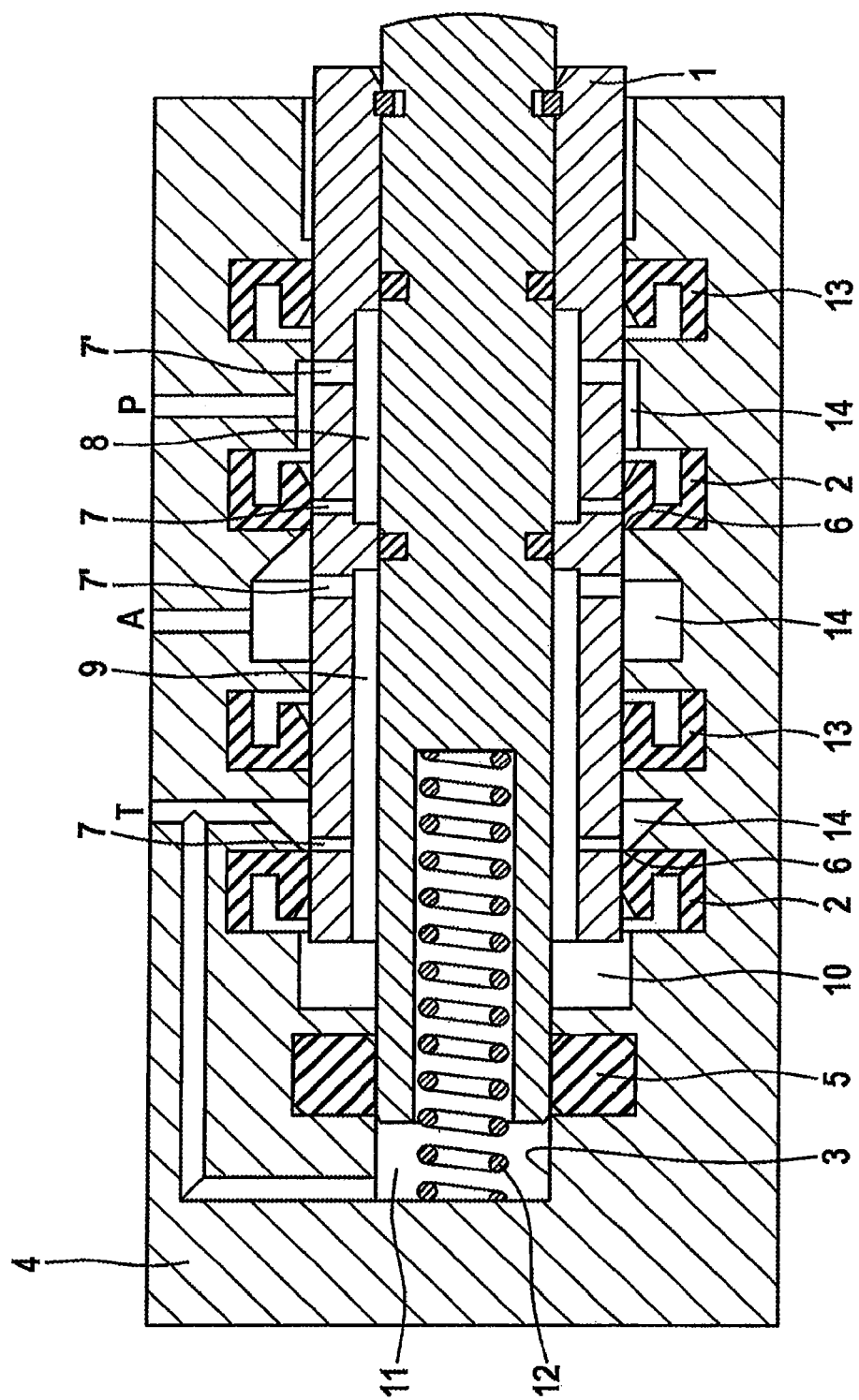

SLIDE VALVE

CROSS REFERENCE TO RELATED APPLICATIONS

This application is the U.S. national phase application of PCT International Application No. PCT/EP2008/050377, filed Jan. 15, 2008, which claims priority to German Patent Application No. 10 2007 004 797.7, filed Jan. 31, 2007 and German Patent Application No. 10 2007 031 290.5, filed Jul. 5, 2007, the contents of such applications being incorporated by reference herein.

BACKGROUND OF THE INVENTION

1. Field of the Invention

The invention refers to a sliding-spool valve for controlling the hydraulic pressure at a working port (A) to values between a low pressure and a high pressure, for which a valve spool is accommodated in a bore of a housing in a linearly movable manner and which has a low-pressure port (T), a high-pressure port (P) and the working port (A), for which in the first position of the valve spool the working port (A) is connected to the low-pressure port (T), while in a second position of the valve spool the working port (A) is isolated from the two further ports (P, T), and also with a third position of the valve spool in which the working port (A) is connected to the high-pressure port (P).

2. Description of the Related Art

Such a sliding-spool valve for pressure control in a brake servo unit is already known from DE 39 12 936 A1. The cost-intensive production of this sliding-spool valve and the constantly existing leakage must be seen as being particularly disadvantageous. The valve spool and the housing as a rule are produced from steel and have to be hardened. For reasons of minimizing leakage, the diameter difference must be very small and the shape tolerances and position tolerances must be designed in an extremely strict manner. This creates high costs in production.

Therefore, the desire for the lowest possible leakage flows presents a particular technical challenge because in the case of the customary sealing by means of a metallically limited gap this has to be designed in the order of magnitude of a few micrometers. Such precision is achievable only with special materials such as ceramic or with the already-mentioned hardened steel. Residual leakage remains in the case of sealing via a gap, nevertheless.

The use of elastomer seals, which enable a leakage-free sealing of sealing gaps if the gap geometry remains unaltered, is indeed already known from machine hydraulics. In the case of the conventional sliding-spool valve, however, this does not apply to the variable sealing gaps on metering edges. All practical attempts to use elastomer materials on variable sealing gaps led to destruction of the corresponding sealing bodies, for example by shearing off on metal metering edges or as a result of intrusion into bores.

SUMMARY OF THE INVENTION

It is an object of at least one aspect of the present invention to improve a sliding-spool valve of the disclosed type in such a way that it does not feature said disadvantages.

According to the features described herein, a leakage-free sliding-spool valve is now created, in which expensive materials and production processes can be dispensed with since it meets the challenges of permanently using elastomers without the risk of damage, even on metering edges, by an elastomer conceptionally not interacting with a metering edge but by the metering edge itself being formed as an elastomer body, by being flexibly designed in the radial direction and by being constantly exposed to flow from the inside outwards.

BRIEF DESCRIPTION OF THE DRAWINGS

The invention is best understood from the following detailed description when read in connection with the accompanying drawings. Included in the drawings is the following figures:

The Figure is a cross-sectional view of an exemplary sliding-spool valve in accordance with an exemplary embodiment of the invention.

DETAILED DESCRIPTION OF THE PREFERRED EMBODIMENTS

With reference to the Figure, the basic construction and the function of the sliding-spool valve according to aspects of the invention are now explained.

The sliding-spool valve, which is represented in longitudinal section, serves for controlling the hydraulic pressure at a working port A at values between a low pressure and a high pressure, for which a piston-like valve spool 1 is accommodated in a bore 3 of a housing 4 in a linearly movable manner and which has a low-pressure port T, a high-pressure port P and the working port A.

In the exemplarily represented first position of the valve spool 1, the working port A is connected to the low-pressure port T, while in a second position of the valve spool 1 the working port A is isolated from the two ports P, T, and also in a third position of the valve spool 1 the working port A is connected to the high-pressure port P. These three positions of the valve spool 1 are passed through in ascending order when operating the valve spool 1 under an operating force which in the figure is directed to the left, wherein the blocking and the opening of the fluid connections on the housing side is carried out by means of encompassing metering edges 6.

In contrast to the prior art, in which the encompassing metering edges on the valve spool interact with radial bores in the housing which are exposable to throughflow, it is now proposed according to the invention to arrange radial bores 7 in the valve spool 1 which are exposable to throughflow and interact with the encompassing metering edges 6 in the housing 4.

The radial bores 7 which interact with the housing-side metering edges 6 are designed in a blockable manner by the mouths of the radial bores 7 being closed off by over-travelling of the metering edges 6 for the blocking. The exposure to throughflow of the blockable radial bores 7 is carried out in the region of a plurality of sealing rings 2 which are fixed in the housing 4, always from the inside outwards, so that damage to the sealing rings 2 as a result of shearing-off or intrusion is excluded.

The metering edges 6 are formed directly on the sealing rings 2 which are securely fixed in annular grooves of the housing 4. For leakage-free sealing of the valve spool 1 in the housing 4, at least the sealing faces of the sealing rings 2 consist of an elastomer material and in the present exemplary embodiment preferably have sealing lips which are used in the case of cup seals.

For simple realization of the desired exposure to throughflow the valve spool 1 has two cavities 8, 9 which are isolated from each other and are exposable to throughflow independently of each other, wherein the one cavity 8 (high-pressure cavity) is in permanent hydraulic communication with the high-pressure port P, and the other cavity 9 (working-pressure cavity) is in permanent hydraulic communication with the working port A. Furthermore, there are permanent hydraulic connections to the two cavities 8, 9, which are formed in a simple manner by means of non-blockable radial bores 7' in the valve spool 1 which are therefore arranged at a distance from the effective area of those metering edges 6 which are over-travelled by the valve spool 1, wherein the non-blockable radial bores 7', in contrast to the radial bores 7 which interact with the metering edges 6, are always exposed to throughflow from the outside inwards.

For simple integration of the two cavities 8, 9, the valve spool 1 is constructed in two sections in such a way that at least the first cavity 8 (high-pressure cavity) is formed as a result of the joining together of the two spool sections. For this purpose, the two spool sections are joined together in a pressure-tight manner so that the first cavity 8 (high-pressure cavity) is sealed so that an exchange of pressurized medium takes place only via the associated radial bores 7, 7'. On the other hand, the second cavity 9 (working-pressure cavity), on account of the clever arrangement of the low-pressure port T, working port A and high-pressure port P in the operating direction, is constructed as an open annulus between the outer sleeve-like spool section and the plunger-like spool section which is pressed into the sleeve-like spool section.

The opening of the second cavity 9 (working-pressure cavity) extends in the operating direction into a radially widened chamber 10 which is delimited by a bore step, wherein the pressure which prevails in each case in the chamber 10 acts upon the valve spool 1 opposite to the operating direction. Since the end of the plunger-like spool section extends from the sleeve-like spool section into the bore step, the hydraulic chamber 10 forms an annulus which is delimited by the stepped bore and the stepped piston section of the valve spool 1 which immerges into it, wherein the volumetric capacity of the chamber 10 depends upon the travel distance of the valve spool 1.

Between the bottom of the bore 3 and the end face of the plunger-like spool section there is a pressure chamber 11 which is connected to the low-pressure port T. As a result of the sealing of the stepped piston section inside the bore 3 by means of a ring seal 5, the pressure-relief chamber 11 is hydraulically isolated in relation to the chamber 10. Inside the pressure chamber 11 there is a spring 12 which acts with a defined force upon the valve spool 1 opposite to its operating direction. Alternatively, the spring 12 can be arranged in the hydraulic chamber 10 and in the working-pressure cavity 9.

In addition, it follows from the Figure that the high-pressure port P leads into an annulus 14 which is integrated in the housing 4 and which in the operating direction of the valve spool 1 is sealed between valve spool 1 and housing 4 by the sealing ring 2 which forms the (high-pressure) metering edge 6, and opposite to the operating direction is sealed between valve spool 1 and housing 4 by a further seal 13, preferably a cup seal. In the same way, the working port A leads into a further annulus 14 of the housing 1, which annulus, however, opposite to the operating direction is sealed between the valve spool 1 and the housing 4 by the sealing ring 2 which forms the (high-pressure) metering edge 6, and in the operating direction is sealed between the valve spool 1 and the housing 4 by a further seal 13, preferably a cup seal. The low-pressure port T admittedly also leads into an annulus 14 in the housing 4, which annulus, however, in the operating direction is sealed between valve spool 1 and housing 4 by the sealing ring 2 which carries the (low-pressure) metering edge 6, and in the operating direction is sealed between valve spool 1 and housing 4 by one of the further seals 13.

Furthermore, it is apparent from the Figure that the blockable radial bores 7 which are associated with the pressure build-up are arranged essentially in one plane, wherein according to desire or requirement a smoother pressure build-up behavior can be created as a result of purposeful small deviations of the bore positions in the direction of the valve spool axis. In addition, it is worth noting that the blockable radial bores 7 have a smaller diameter than the non-blockable radial bores 7', with which a further contribution to the longevity of the sealing rings 2 which undertake the function of metering edges 6 is achieved.

The invention claimed is:

1. A sliding-spool valve for controlling the hydraulic pressure at a working port to values between a low pressure and a high pressure, for which a valve spool is accommodated in a bore of a housing in a linearly movable manner and which has a low-pressure port, a high-pressure port and the working port, for which in the first position of the valve spool the working port is connected to the low-pressure port, while in a second position of the valve spool the working port is isolated from the two further ports, and also with a third position of the valve spool in which the working port is connected to the high-pressure port, wherein a plurality of radial bores which are exposable to throughflow are arranged in the valve spool and interact with a plurality of encompassing metering edges in the housing, wherein the valve spool has two cavities which are isolated from each other and exposable to throughflow independently of each other, wherein the one cavity is in permanent hydraulic communication with the high-pressure port and the other cavity is in permanent hydraulic communication with the working port.

2. The sliding-spool valve as claimed in claim 1, wherein the valve spool is constructed in two sections, wherein the first cavity is produced by the joining together of the two spool sections.

3. The sliding-spool valve as claimed in claim 1, wherein the radial bores which interact with the metering edges are radially exposable to throughflow from the inside outwards in the region of a plurality of sealing rings which are fixed in the housing.

4. The sliding-spool valve as claimed in claim 3, wherein the metering edges are formed directly on the sealing rings and are securely fixed in annular grooves of the housing.

5. The sliding-spool valve as claimed in claim 3, wherein for leakage-free sealing of the valve spool in the housing at least sealing faces of the sealing rings consist of an elastomer material.

6. The sliding-spool valve as claimed in claim 1, wherein the high-pressure port leads into an annulus which is integrated in the housing and which in the operating direction of the valve spool is sealed between the valve spool and housing by a sealing ring which forms a high-pressure metering edge, and opposite to the operating direction is sealed between the valve spool and housing by a further seal.

7. The sliding-spool valve as claimed in claim 6, wherein the working port leads into a further annulus of the housing, which annulus opposite to the operating direction of the valve spool is sealed between the valve spool and the housing by the sealing ring which forms the high-pressure metering edge, and in the operating direction is sealed between the valve spool and the housing by a further seal.

8. The sliding-spool valve as claimed in claim 7, wherein the low-pressure port leads into an annulus in the housing, which annulus in the operating direction is sealed between valve spool and housing by the sealing ring which carries a low-pressure metering edge, and in the operating direction is sealed between valve spool and housing by one of the further seals.

9. The sliding-spool valve as claimed in claim 1, wherein the radial bores which interact with the housing-side metering edges are designed in a blockable manner by the mouths of the radial bores being closable by over-travelling of the metering edges for the blocking.

10. The sliding-spool valve as claimed in claim 9, wherein there are further permanent hydraulic connections to the two cavities, which are formed by means of non-blockable radial bores in the valve spool which are arranged at a distance from the working area of those metering edges which can be over-travelled by the valve spool.

11. The sliding-spool valve as claimed in claim 10, wherein the non-blockable radial bores, in contrast to the blockable radial bores which interact with the metering edges, are exposed to throughflow exclusively from the outside inwards.

12. The sliding-spool valve as claimed in claim 11, wherein the blockable radial bores are arranged on the valve spool approximately in one plane, and in that the blockable radial bores have a smaller diameter than the non-blockable radial bores.

13. The sliding-spool valve as claimed in claim 1, wherein the second cavity in the operating direction of the valve spool is constructed as an open annulus which is arranged between an outer sleeve-like spool section and a plunger-like spool section which extends into the sleeve-like spool section.

14. The sliding-spool valve as claimed in claim 13, wherein the second cavity in the operating direction of the valve spool extends into a radially widened chamber which is delimited by a bore step, wherein the valve spool can be acted upon opposite to the operating direction of the valve spool by a pressure which prevails in the chamber.

15. The sliding-spool valve as claimed in claim 14, wherein the radially widened chamber is formed as an annulus, the volumetric capacity of which is determined by the travel distance of the valve spool.

16. The sliding-spool valve as claimed in claim 14, wherein between a terminal end of the bore and an end face of the plunger-like spool section, a pressure-relief chamber, which is isolated from the radially widened chamber, is arranged on the valve spool and is connected to the low-pressure port.

17. The sliding-spool valve as claimed in claim 16, wherein for creating a restoring force upon the valve spool, a spring is arranged between the housing and the valve spool, and with a force which is dependent upon the operating distance acts upon the valve spool opposite to its operating direction.

18. The sliding-spool valve as claimed in claim 17, wherein the spring is arranged inside the pressure-relief chamber.

\* \* \* \* \*